UNITED STATES PATENT OFFICE.

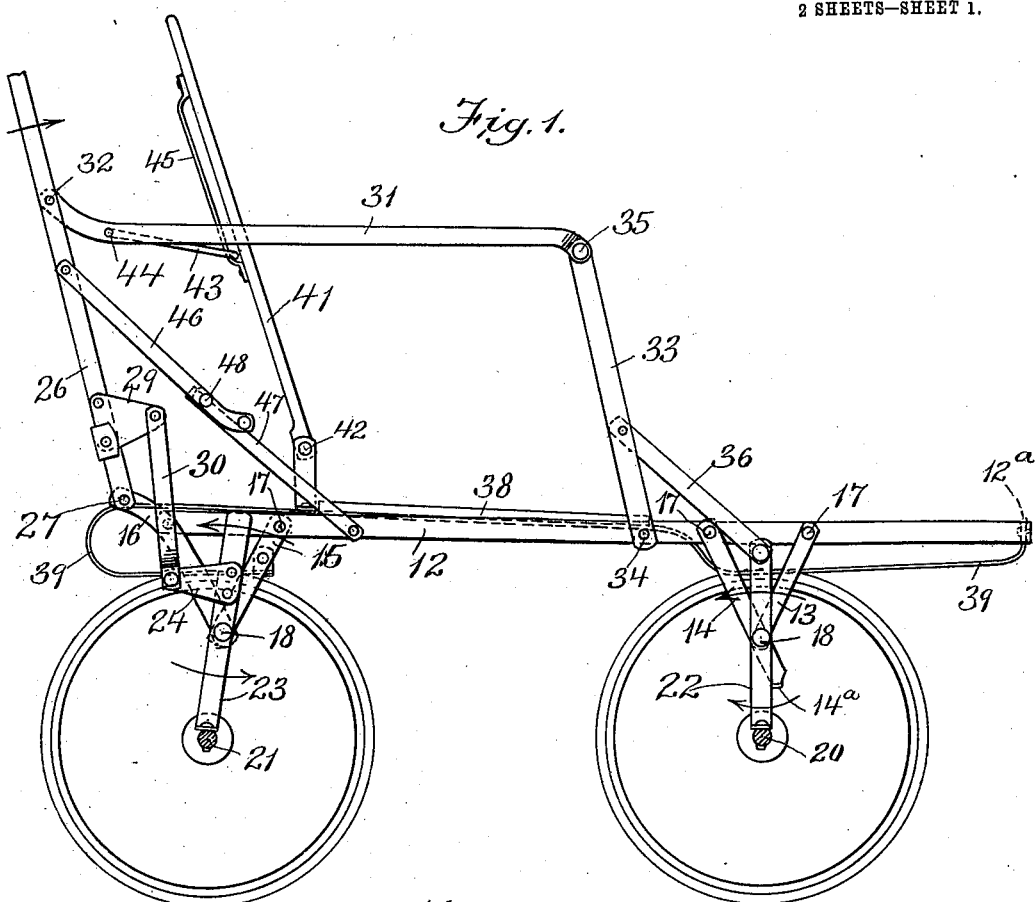
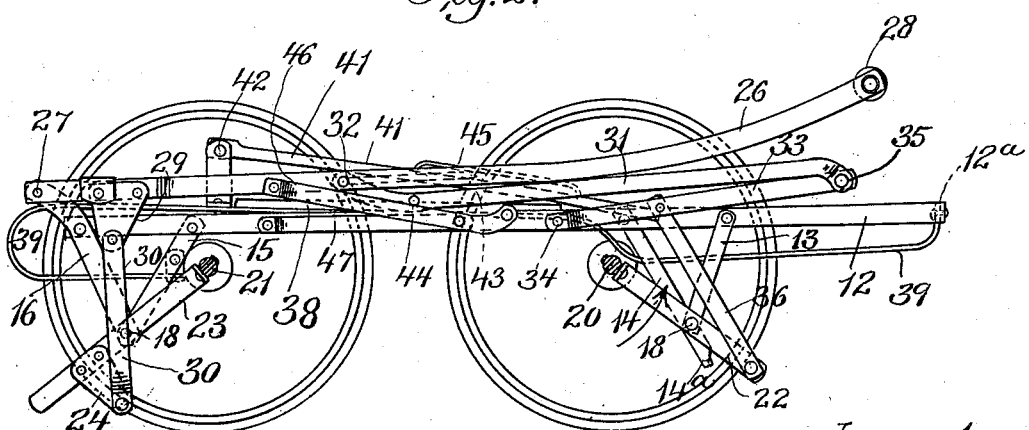

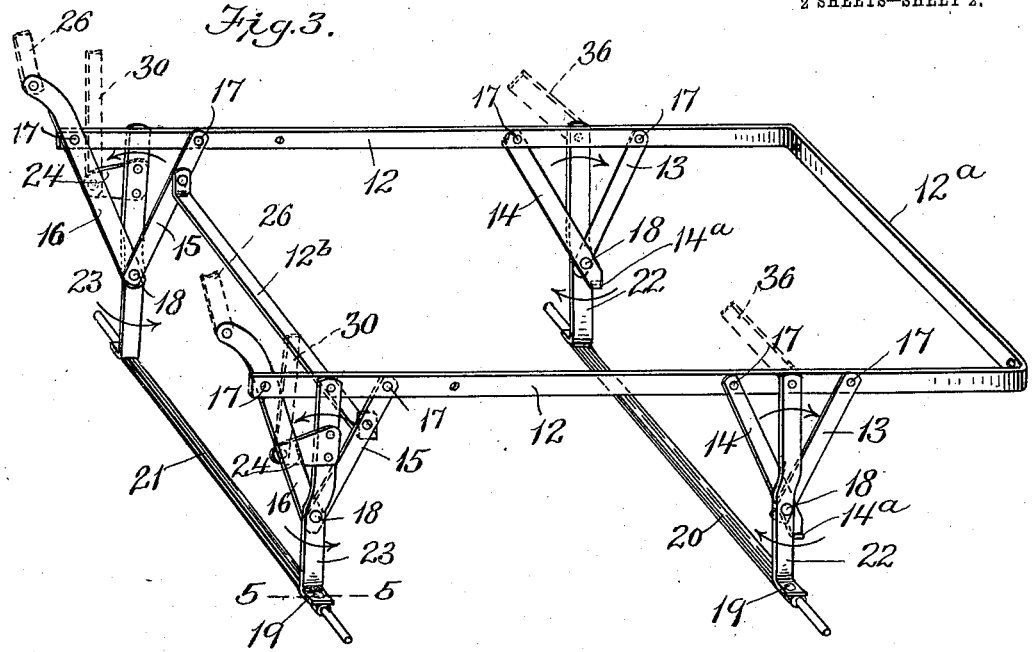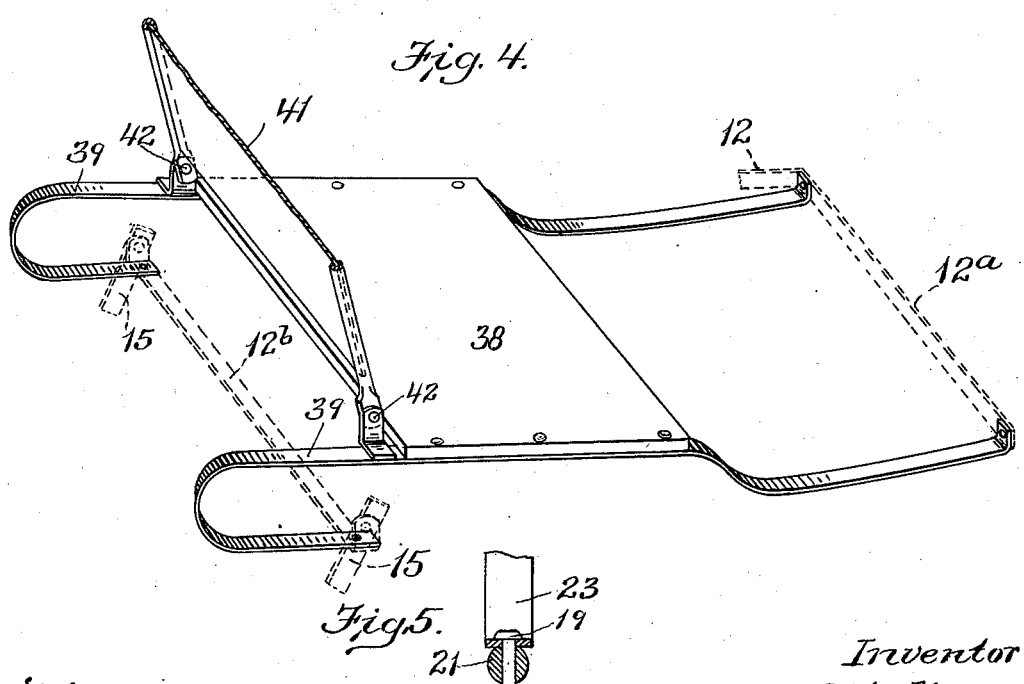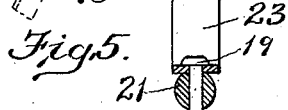

OTTO KURZ, OF CHICAGO, ILLINOIS, ASSIGNOR TO BAY STATE METAL WHEEL COMPANY, OF EAST TEMPLETON, MASSACHUSETTS, A CORPORATION OF MAINE.

COLLAPSIBLE GO-CART.

1,035,976.  Specification of Letters Patent.  Patented Aug. 20, 1912.

Application filed December 12, 1911. Serial No. 665,264.

*To all whom it may concern:*

Be it known that I, OTTO KURZ, a subject of the Emperor of Germany, of Chicago, in the county of Cook and State of Illinois, have invented certain new and useful Improvements in Collapsible Go-Carts, of which the following is a specification.

This invention relates to children's carriages having relatively small wheels, and known as "go-carts," the construction being such that the cart may be folded or collapsed for convenience in shipment and storage.

The invention has for its object to provide improved mechanism for simultaneously reducing the distance between the front and rear wheels to shorten the wheel base, and at the same time reduce the distance between the wheel axles and the base frame which supports the seat, top, and push bars of the cart, the invention being embodied in a cart in which the wheels do not fold under the base frame, each pair of wheels being mounted on a continuous axle so that the distance between the wheels of each pair is invariable.

The invention consists in the improvements which I will now proceed to describe and claim.

Of the accompanying drawings which form a part of this specification,—Figure 1 represents a side elevation showing my improved go-cart opened or erected for use; Fig. 2 represents a side view showing the cart collapsed; Fig. 3 represents a perspective view showing the base frame, the axles, and the levers which connect the axles with the base frame, the seat and its supporting springs and the wheels being removed; Fig. 4 represents a perspective view showing the seat and its supporting springs and a portion of the hinged back; Fig. 5 represents a section on line 5—5 of Fig. 3.

The same reference characters indicate the same parts in all the figures.

The base frame of my improved cart is composed of longitudinal side members 12 connected at their forward ends by a front transverse member 12ª, these being preferably composed of a single bent strip, as shown by Fig. 3.

The base frame is provided with front and rear downwardly projecting brackets, each preferably composed of short strips riveted at their upper ends to the side members of the frame and at their lower ends to each other, the two strips forming a V-shaped bracket. Each front bracket is composed of the strips 13 and 14, and each rear bracket is composed of the strips 15 and 16, the upper ends of the several strips being attached by rivets 17 to the base frame. The rivets 18, which connect the lower ends of said strips, constitute journals on which two pairs of levers 22 and 23 are journaled, said levers being rigidly attached by rivets 19 (Fig. 5) to the front and rear axles 20, 21, and being called the front and rear levers. Each of said levers has a lower arm and an upper arm, the lower arms being the portions shown below the rivets or journals 18 in Figs. 1 and 3, while the upper arms are the portions above said journals. When the cart is open or erect the levers 22, 23 are substantially vertical, and the axles are at the maximum distance from the base frame, the levers being securely held from swinging on the rivets 18 by the mechanism hereinafter described.

To the upper arms of the rear levers 23 are rigidly attached rearwardly projecting ears 24 forming bell crank lever arms. The push bars 26 by which the cart is propelled are pivoted at 27 to fixed parts of the base frame, and preferably to the extended upper ends of the strips 16 of the rear brackets. Said push bars are connected at their upper ends by the usual transverse handle 28 (Fig. 2) and are provided near their lower ends with forwardly projecting ears 29 which are connected by rods 30 with the ears 24. The ears 24 and 29, and the links 30, constitute connections between the push bars 26 and the rear levers 23, which cause a forward movement of the push bars to the position shown by Fig. 2, to partially invert the rear levers 23 and thus move the rear axle laterally toward the front axle and upwardly toward the base frame, the arms of the rear levers moving in the directions indicated by the arrows in Figs. 1 and 3.

Connections are provided between the push bars 26 and the upper arms of the front levers 22, which also cause a forward movement of the push bars to partially invert the front levers and move the front axle 20 laterally toward the rear axle and upwardly toward the base frame, the movement of the arms of the front levers being opposite to that of the arms of the rear levers. Said connections, as here shown, comprise foldable side guards at opposite sides of the base frame and composed of longitudinal members 31, the rear ends of which are pivoted at 32 to the push bars 26, and upright members 33, the lower ends of which are pivoted at 34 to the base frame, the meeting ends of the said members being pivoted together at 35. The members 33 are connected with the upper arms of the front levers 22 by connecting rods 36, the arrangement being such that a forward movement of the push bars acts through the members 31 and 33, and connecting rods 36 to partially invert the front levers.

It will now be seen that the push bars 26, in moving from the erect position shown by Fig. 1, to the folded position shown by Fig. 2, move the axles simultaneously toward each other and upwardly toward the base frame, the upper portions of the wheels being thus caused to project above the base frame. The wheel base is thus shortened and the height of the cart reduced, without any increase in the length of the cart.

The strips 14 forming parts of the front brackets are extended below the rivets 18 of said brackets and bent to form stops 14ᵃ adapted to abut against the lower arms of the front levers 22, and limit the movement of said levers in the direction required to open or erect the cart. In other words, the movement of the lower arms of the front levers 22 in the direction indicated by the arrow in Fig. 2 (this being the movement caused by the erection of the cart) is limited by the stops 14ᵃ, these stops abutting against the levers 22 when the cart is fully erected, as shown by Fig. 1, and preventing further lateral movement of the front axle away from the rear axle. The said stops also act through the front levers 22, connecting rods 36, guard members 33 and 31, push bars 26, and the connections between the push bars and the rear levers 23, to prevent lateral movement of the rear axle away from the front axle when the cart is fully erected. The rear levers 23 are preferably inclined slightly forward from their lower to their upper ends when the cart is erected, as shown by Fig. 1, so that the weight of the cart body and its contents will not tend to displace or move the levers in the directions indicated by the arrows in Fig. 1.

The seat 38 of the cart is attached to longitudinal springs 39, having U-shaped rear end portions, the extremities of which are attached to the rear transverse member 12ᵇ of the base frame, said member being attached to the strips 15 of the rear brackets and being located below the base frame. The forward ends of the springs 39 are attached to the front transverse member 12ᵃ of the base frame. The springs and seat are free to rise and fall in the space between the side members 12 of the base frame. The usual back piece 41 is connected by hinges 42 with the springs 39, and is adapted to swing forward over the seat, said back being supported when in use by a bail 43 pivoted at 44 to the guard members 31 and engaged with elongated offset rods 45 attached to the back.

When the cart is erected the push bars 26 are held against forward movement by folding rule-joint braces composed of links 46, 47, pivoted together at 48 and pivoted at their ends to the push bars and to the side members 12 respectively.

I claim:—

1. A collapsible go-cart comprising a base frame having downwardly projecting front and rear brackets, front and rear levers fulcrumed on said brackets and having upper and lower arms, front and rear axles attached to the lower lever arms, and mechanism for simultaneously swinging said levers in opposite directions, to move the axles laterally toward each other and upwardly toward the base frame and collapse the cart, the lower front and rear lever arms being moved toward each other during the collapsing operation, and the upper portions of the wheels projecting above the base frame when the cart is collapsed, the front brackets being provided with stops which coöperate with the lower arms of the front levers and with the lever-swinging mechanism in preventing the lower front and rear lever arms from swinging away from each other when the cart is opened.

2. A collapsible go-cart comprising a rigid, non-collapsible base frame having downwardly projecting brackets, invertible levers fulcrumed on said brackets and having lower and upper arms, axles attached to the lower lever arms and provided with wheels, said levers being adapted to swing in opposite directions to reduce the height of the cart, push bars pivoted to the rear portion of the base frame, and connections between the push bars and the upper arms of the levers, whereby, when the push bars are swung forward over the base frame, the levers are partially inverted, their lower arms and the axles being moved simultaneously toward each other and upward toward the base frame.

3. A collapsible go-cart comprising a base frame having downwardly projecting brackets, front and rear levers fulcrumed on said brackets and having lower and upper arms, front and rear axles attached to the lower lever arms, the levers attached to the rear axle being provided with rearwardly projecting ears attached to the upper arms, push bars pivoted to the rear portion of the base frame and having forwardly projecting ears, links connecting the ears on the rear levers with the ears on the push bars whereby, when the push bars are swung forward the rear levers are partially inverted, and connections between the push bars and the front levers whereby a forward swinging movement of the push bars is caused to partially invert the front levers, the axles being simultaneously moved toward each other and upward toward the base frame.

4. A collapsible go-cart comprising a base frame having downwardly projecting brackets, front and rear levers fulcrumed on said brackets, and having lower and upper arms, front and rear axles attached to the lower arms, push bars pivoted to the rear portion of the base frame, foldable guards composed of longitudinal members pivoted at their rear ends to the push bars, and upright members pivoted at their lower ends to the base frame, the meeting ends of said guard members being pivoted together, links connecting said upright guard members with the upper arms of the front levers, said guard members and links being adapted to partially invert the front levers when the push bars are swung forward, and connections between the push bars and the upper arms of the rear levers whereby a forward swinging movement of the push bars is caused to partially invert the rear levers, the axles being moved simultaneously inward and upward toward the base frame.

5. A collapsible go-cart comprising a base frame having downwardly projecting brackets, front and rear levers fulcrumed on said brackets and having lower and upper arms, front and rear axles attached to the lower lever arms, push bars pivoted to the rear portion of the base frame, foldable guards composed of longitudinal members pivoted at their rear ends to the push bars, and upright members pivoted at their lower ends to the base frame and at their upper ends to the forward ends of the longitudinal guard members, connections between the push bars and the upper arms of the rear levers, and connections between the upright guard members and the upper arms of the front levers, whereby when the push bars are swung forward the axles are moved simultaneously toward each other and upward toward the base frame.

6. A collapsible go-cart, comprising a base frame having downwardly projecting front and rear brackets, front and rear levers fulcrumed on said brackets and having lower and upper arms, front and rear axles attached to the lower lever arms, push bars pivoted to the rear portion of the base frame, and connections between the push bars and the upper arms of the levers whereby the levers are caused to swing the axles laterally toward each other and upwardly toward the base frame, the front brackets being provided with stops which limit the movement of the front levers in one direction.

7. A collapsible go-cart, comprising a base frame composed of longitudinal side members having downwardly projecting front and rear brackets, a transverse spring-supporting front member connecting the forward ends of the side members, and a transverse spring-supporting rear member attached to and connecting the rear brackets and located below the side members, longitudinally extending seat-supporting springs attached to said front and rear members, front and rear levers fulcrumed on said brackets, front and rear axles attached to the lower lever arms, and means for simultaneously swinging said levers to move the axles laterally toward each other and upwardly toward the base frame, the upper portions of the wheels projecting above the base frame and springs when the cart is collapsed.

In testimony whereof I have affixed my signature in presence of two witnesses.

OTTO KURZ.

Witnesses:
FRED. W. DOBE,
EMIL F. BERGER.

---

Copies of this patent may be obtained for five cents each, by addressing the "Commissioner of Patents, Washington, D. C."